(12) United States Patent
Christensen et al.

(10) Patent No.: US 6,242,517 B1
(45) Date of Patent: Jun. 5, 2001

(54) AQUEOUS RESIN COMPOSITIONS

(75) Inventors: Scott Patrick Christensen; Brian T. Keen, both of Charleston, WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/226,450

(22) Filed: Jan. 6, 1999

(51) Int. Cl.⁷ ............................................. C08J 5/06
(52) U.S. Cl. ................................................. 524/376
(58) Field of Search ............................. 524/376

(56) References Cited

U.S. PATENT DOCUMENTS

| | | | |
|---|---|---|---|
| 3,446,764 | 5/1969 | Phillips et al. | 260/22 |
| 4,131,585 | 12/1978 | Feigin | 260/29.6 |
| 4,525,512 | 6/1985 | Hudson | 524/284 |
| 5,238,987 | 8/1993 | Bodwell et al. | 524/376 |
| 5,753,738 | 5/1998 | Chapman et al. | 524/376 |

OTHER PUBLICATIONS

Abstract Pollock, K. Douglas et al. "Fundamentals of Glycol Ethers in Coupling Solvents," The Dow Chemical Company pp. 49–52, no date.

*Primary Examiner*—Peter D. Mulcahy
(74) *Attorney, Agent, or Firm*—K. D. Tremain

(57) ABSTRACT

Novel water-borne resin compositions useful in architectural or industrial coatings comprising:

(a) a resin
(b) a coupling solvent comprising ethylene glycol pentyl ether which contains at least about 90% by weight of ethylene glycol n-pentyl ether, and
(c) water.

8 Claims, No Drawings

AQUEOUS RESIN COMPOSITIONS

FIELD OF THE INVENTION

This invention relates to aqueous resin compositions which contain a novel coupling solvent and are useful in architectural or industrial coating compositions such as paints and protective coating formulations.

BACKGROUND OF THE INVENTION

The paints and coatings industry is continually looking for new formulations which meet demands for better product performance. In addition, the industry is faced with increasing pressure from regulatory efforts to reduce the release of volatile organic solvents into the environment when coating formulations are applied to a substrate. This has led the industry to step up efforts to develop high performance, resin-based architectural coating formulations in which the resin is water-borne, i.e. dispersed or emulsified in water, thus reducing the amount of volatile organic solvents present.

It is well known that a suitable coupling solvent needs to be present in water-borne resin coating compositions to achieve acceptable film forming and other properties when applied to a substrate. The resins used in coating compositions are normally not dissolved by water. The coupling solvent increases the mutual solubility between the resin and the water thus increasing the homogeneity of a coating composition and improving its performance when applied as a protective coating. Normally, sufficient coupling solvent must be present to maintain a single phase resin/water mixture for any ratio of water to resin. Because compounds useful as coupling solvents are relatively expensive and in light of the effort to reduce the presence of volatile organic compounds in coating compositions, there is a need to find solvents having a high degree of coupling power or coupling efficiency so as to achieve the desired results with a minimum amount of solvent present. Coupling power efficiency may be quantified as a "coupling number", which number represents the minimum mole percent of solvent required to ensure a single phase system at any ratio of water to resin.

Glycol ethers have been recognized as useful coupling solvents. In an article titled "Fundamentals of Glycol Ethers in Coupling Solvents", D. K. Pollock and R. J. LaTulip, The Dow Chemical Company, presented at Proceedings of the ESD/ASM, Advanced Coatings Technology Conference, Jun. 10–12, 1991, Dearborn, Mich., the coupling efficiency of glycol ethers prepared from ethylene oxide and propylene oxide having an alkyl group of one to four carbon atoms were evaluated in various hydrocarbon/water mixtures. Ethylene glycol ethers, in particular ethylene glycol butyl ether, was found to perform satisfactorily as a coupling agent in mixtures of lower hydrocarbons such as cyclohexane or decane and water. However, all of the ethylene oxide based glycol ethers tested, including ethylene glycol butyl ether, were found to be too hydrophilic to perform satisfactorily as a coupling solvent in mixtures of water and higher hydrocarbons such as hexadecane.

U.S. Pat. No. 5,753,738 describes certain alkoxy ethoxyethanol compounds which are useful as coupling solvents. The coupling efficiency of these diethylene glycol ethers was tested in mixtures of heptane and water and in aqueous resin systems and compared to commercially available coupling solvents such as ethylene glycol butyl ether, ethylene glycol hexyl ether and diethylene glycol butyl ether. The data in tables 1 to 5 of this patent suggests that among the commercially available coupling solvents tested ethylene glycol butyl ether has the best coupling efficiency followed by diethylene glycol butyl ether with ethylene glycol hexyl ether being the least effective.

SUMMARY OF THE INVENTION

According to the present invention, applicants have discovered a specific glycol ether composition which is useful as a coupling solvent as demonstrated by coupling efficiency tests performed in hexadecane and water mixtures. More specifically, the present invention relates to water-borne resin compositions which comprise a resin component, water and a coupling solvent comprising a predominately normal or straight chain ethylene glycol pentyl ether composition containing at least 90% by weight, based on the total weight of the glycol ether composition of ethylene glycol n-pentyl ether.

DESCRIPTION OF THE INVENTION

The water-borne resin compositions of the present invention comprise (a) a resin component, (b) water and (c) a novel glycol ether coupling solvent component whose coupling efficiency has heretofore gone unrecognized in the art. The coupling solvent component which applicants have discovered exhibits unexpectedly good coupling efficiency when tested in hexadecane/water mixtures is a predominately normal or straight chain ethylene glycol pentyl ether composition containing at least 90% by weight, based on the total weight of the component of ethylene glycol n-pentyl ether. The presence of higher amounts of ethylene glycol n-pentyl ether appears to improve coupling efficiency and particularly good results are obtained when the coupling solvent component contains at least 95% by weight of ethylene glycol n-pentyl ether.

The ethylene glycol pentyl ether coupling solvent component containing at least 90% by weight of ethylene glycol n-pentyl ether may be obtained using known processes and techniques. Such a product is advantageously prepared by reacting pentanol containing at least 90% n-pentanol with ethylene oxide in the presence of a basic or acidic catalyst. Pentanol containing at least 90% n-pentanol may be prepared directly utilizing oxo technology disclosed in U.S. Pat. Nos. 3,527,809; 4,283,562; 4,593,011; 4,762,817; 4,769,498; 5,113,022; 5,180,854 and 5,364,950 or by appropriate refining of a pentanol product containing more than 10% isomers using known techniques. The ethylene glycol n-pentyl ether product used in the present invention contains minor amounts, i.e. 10% or less of the ethylene glycol 2-methylbutyl ether isomer but is otherwise essentially free of isomers including highly toxic species such as ethylene glycol 3-methylbutyl ether.

The amount of ethylene glycol n-pentyl ether present in the water-borne resin compositions of the present invention will vary depending on the type and amount of resin present with the optimum amount easily being determined by the skilled formulator. Typically, the ethylene glycol n-pentyl ether component will be present in an amount of from about 0.2 to about 50% by weight, based on the total weight of the water-borne resin composition.

The water-borne resin compositions of the present invention may contain other organic solvents in addition to the ethylene glycol n-pentyl ether. Suitable compounds which may be useful as cosolvents with ethylene glycol n-pentyl ether are well known and may be selected from alcohols, glycols, glycol ethers, glycol ether esters, ketones, esters, aliphatic and aromatic hydrocarbons, halogenated hydrocarbons, nitriles, amides and carbonates. Examples of such compounds include, without limitation, ethanol, butanol, ethylene glycol, ethylene glycol ethyl ether, ethylene glycol propyl ether, ethylene glycol butyl ether, ethylene glycol hexyl ether, diethylene glycol ethyl ether, diethylene glycol butyl ether, propylene glycol t-butyl ether and mixtures thereof.

Resins useful in the compositions of the present invention tend to be hydrophobic and may be any of the resins known in the art to be suitable for use in paints and protective coatings. Examples of such resins include, but are not limited to alkyds, epoxies, polyesters, polyurethanes, acrylics, vinyl resins, styrene resins, styrene-acrylic resins, styrene-butadiene resins, vinyl acetate resins and mixtures thereof. Typically, the amount of resin present in the aqueous resin compositions of the present invention will be in the range of about 10 to about 75% by weight based on the total weight of the composition. The ethylene glycol n-pentyl ether coupling solvents are particularly useful with alkyd resins.

When used in paints and protective coatings, the waterborne resin compositions of this invention may include any of the well-known and conventional additives such as flow-control agents, adhesion promoters, wetting agents, cross-linking agents, surfactants, plasticizers, drying retarders, biocides, anti-foaming agents, rheology modifiers, pigments, fillers and the like. Selection and use of such additives is well within the capabilities of the skilled formulator.

The amount of water present in the water-borne resin compositions of this invention will depend upon the type and amount of resin present and the intended use of such composition. Typically, the amount of water used in such compositions will be in the range of about 5 to about 75% by weight, based on the total weight of the composition. Selection of the appropriate amount of water and the manner in which the various ingredients are combined to prepare the resin compositions of this invention are within the skill of a knowledgeable formulator.

EXAMPLES

Coupling numbers for commercially available, ethylene glycol hexyl ether (EGHE) and an ethylene glycol pentyl ether compound of the present invention (EGPE) were determined in a hexadecane/water system. The ether compound of the present invention which was tested contained about 99% by weight of ethylene glycol n-pentyl ether.

To obtain the coupling numbers for the glycol ethers tested, ternary phase diagrams were prepared for the water-EGHE-hexadecane and water-EGPE-hexadecane from phase composition measurements obtained at 25° C. by compositional analysis of phases equilibrated in a constant temperature bath for at least 24 hours. Water composition was determined by Karl Fisher titration: glycol ether and hexadecane compositions were determined by gas chromatography. Phase boundaries for the ternary systems are drawn through the data points plotted in the ternary phase diagrams. The coupling number for a particular glycol ether, which is the minimum mole percent of that glycol ether required to ensure a single phase system at any ratio of water to hexedecane, is determined from the phase boundary curve of the relevant ternary phase diagram.

The coupling numbers for EGHE and EGPE obtained from the hexadecane ternary diagrams are shown in Table 1 and compared with the coupling number determined for EGBE in the article titled "Fundamentals of Glycol Ethers in Coupling Solvents" (the "Dow Article") discussed earlier.

TABLE 1

| Glycol Ether | Coupling Number |
| --- | --- |
| Ethylene Glycol Butyl Ether | 61 |
| *Ethylene Glycol n-Pentyl Ether | 40 |
| Ethylene Glycol Hexyl Ether | 41 |

*Invention

When a higher hydrocarbon such as hexadecane is present in an aqueous mixture, it might be expected that a glycol ether having a longer alkyl chain would have a lower coupling number than a glycol ether with a shorter alkyl chain. This does in fact prove to be the case as shown by the coupling numbers for ethylene glycol butyl ether and ethylene glycol hexyl ether in Table 1. However, the coupling number for the ethylene glycol n-pentyl ether compound of the present invention shown in Table 1 is suprisingly low as compared to the other ethers. The data from the Dow article and that in Table 1 suggests that ethylene glycol pentyl ether would have a coupling number of at least 50 or higher for hexadecane mixtures. The coupling number of the ethylene glycol pentyl ether of the present invention is at least 20% lower than what might be expected for a pentyl glycol ether.

What is claimed is:

1. An aqueous composition useful in paints and protective coatings comprising:
   (a) a resin,
   (b) a coupling solvent comprising ethylene glycol pentyl ether which contains at least about 90% by weight of ethylene glycol n-pentyl ether, and
   (c) water.
2. The composition of claim 1 wherein said resin is selected from the group consisting of alkyds, epoxies, polyesters, polyurethanes, acrylics, vinyl resins, styrene resins, styrene-acrylic resins, styrene-butadiene resins, vinyl acetate resins and mixtures thereof.
3. The composition of claim 2 wherein the resin is an alkyd resin.
4. The composition of claim 1 wherein said ethylene glycol pentyl ether contains at least about 95% ethylene glycol n-pentyl ether.
5. The composition of claim 1 wherein the resin is present in an amount of from about 10 to about 75% by weight, based on the total weight of the composition.
6. The composition of claim 5 wherein the ethylene glycol pentyl ether is present in an amount of from about 0.2 to about 50% by weight.
7. An architectural or industrial coating composition containing the aqueous resin composition of claim 1.
8. A method of improving the film forming properties of an architectural coating composition by adding thereto an effective amount of the aqueous resin composition of claim 1.

* * * * *